April 10, 1962 R. L. PHELAN ETAL 3,028,956
RECORD CARD TRANSPORT SYSTEM
Filed April 13, 1959 7 Sheets-Sheet 1

INVENTORS.
ROY L. PHELAN
WILLIAM F. MINARD
KENNETH L. LOCKEY.
BY Wallace P. Lamb
ATTORNEY.

INVENTORS.
ROY L. PHELAN
WILLIAM F. MINARD
KENNETH L. LOCKEY.
BY Wallace P. Lamb
ATTORNEY.

April 10, 1962   R. L. PHELAN ETAL   3,028,956
RECORD CARD TRANSPORT SYSTEM
Filed April 13, 1959   7 Sheets-Sheet 3

INVENTORS.
ROY L. PHELAN
WILLIAM F. MINARD
KENNETH L. LOCKEY.
BY Wallace P. Lamb
ATTORNEY.

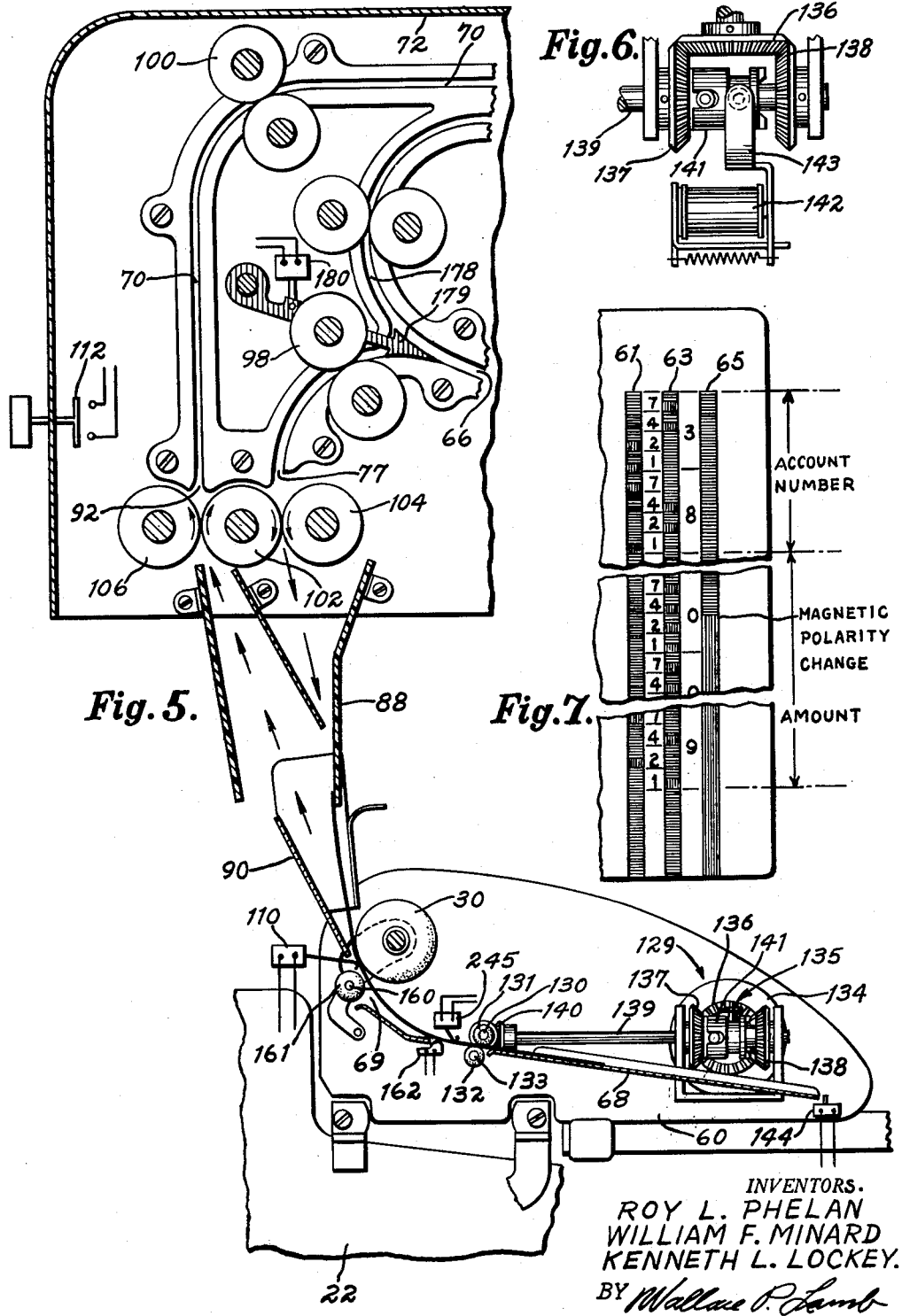

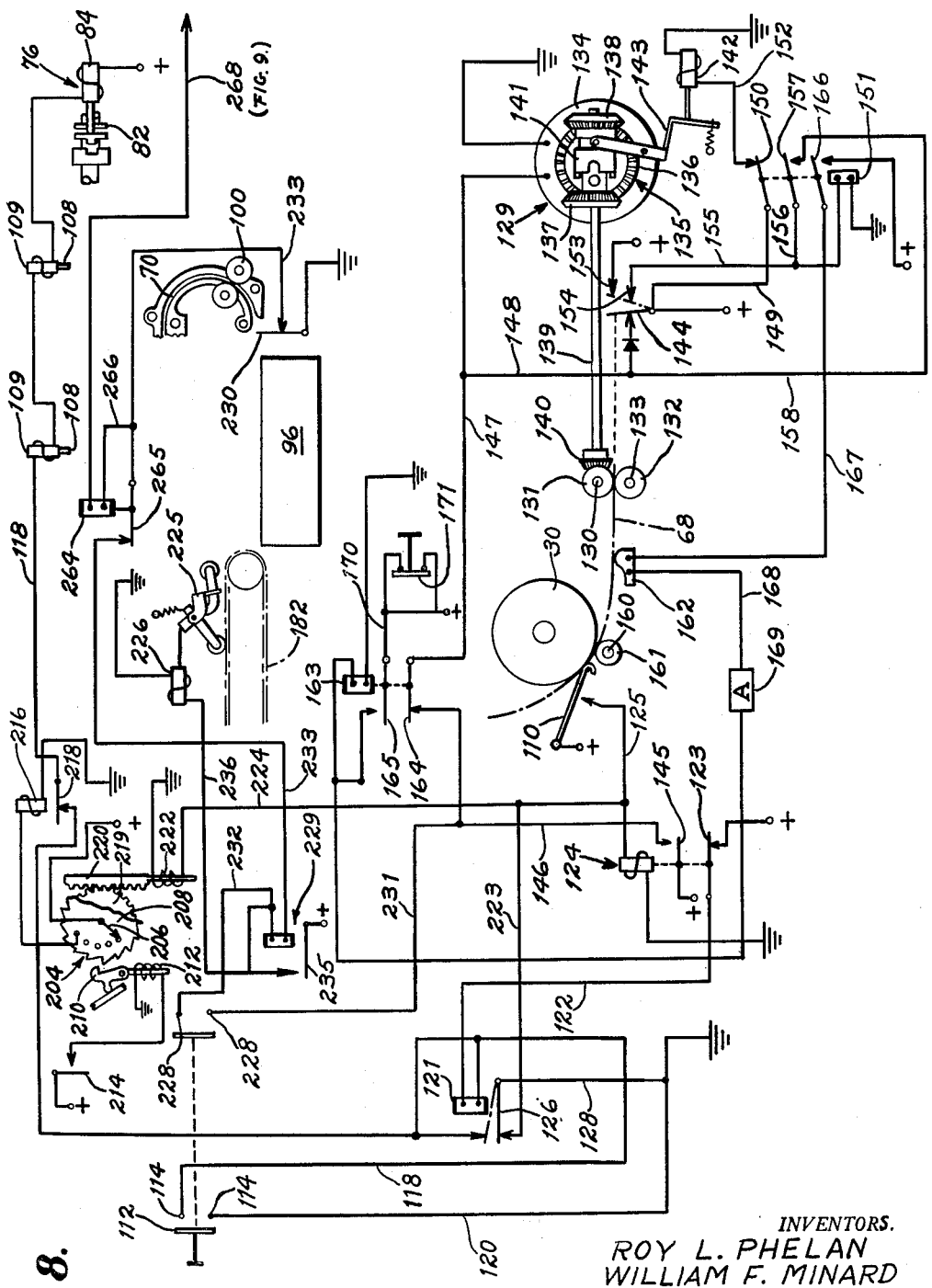

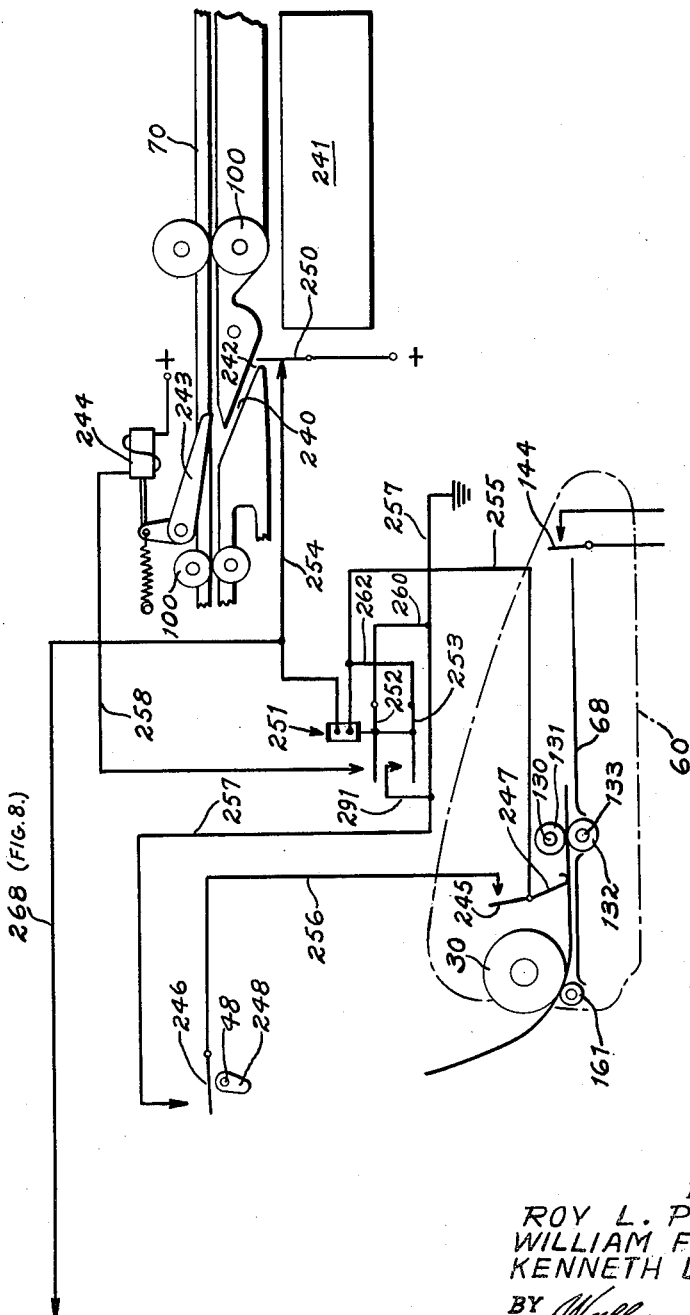

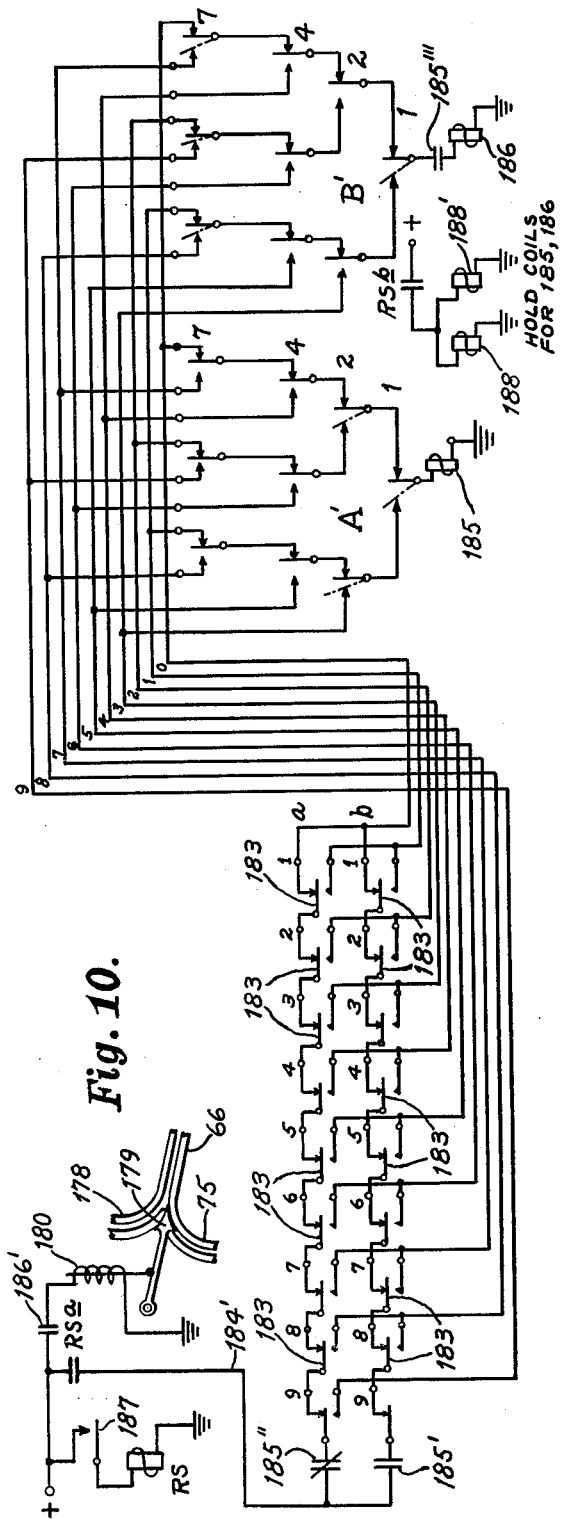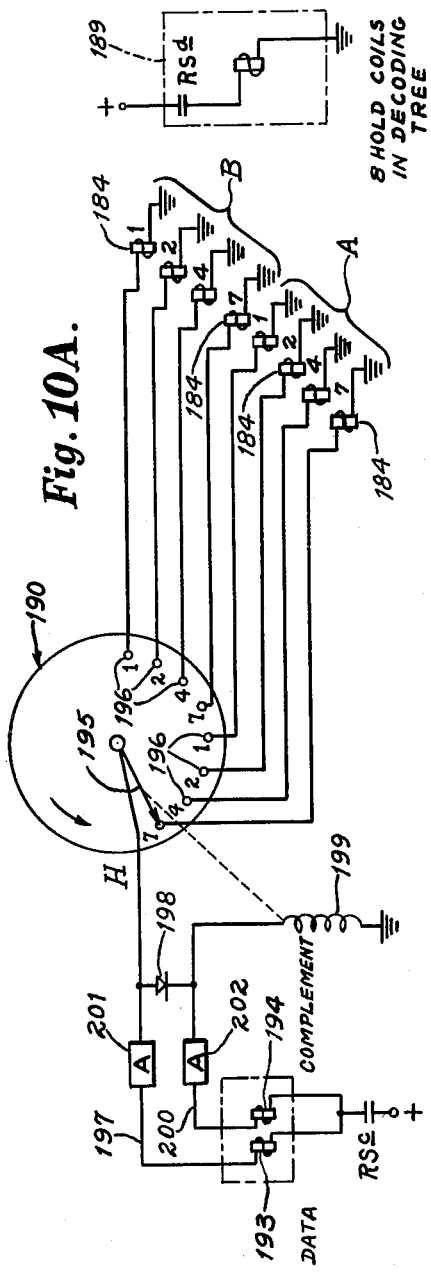

United States Patent Office 3,028,956
Patented Apr. 10, 1962

3,028,956
RECORD CARD TRANSPORT SYSTEM
Roy L. Phelan and William F. Minard, Plymouth, and Kenneth L. Lockey, Livonia, Mich., assignors to Burroughs Corporation, Detroit, Mich., a corporation of Michigan
Filed Apr. 13, 1959, Ser. No. 805,957
14 Claims. (Cl. 209—72)

This invention relates generally to accounting apparatus and particularly to a system for transporting and controlling the disposition of record or ledger cards with respect to an information recording device.

It is the principal object of the invention to provide an improved card handling or transport system and controls therefor to control the delivery of account cards to the recording means of a business machine so as to reduce the need for manual card handling and visual searching for cards by the operators of such machines.

Another object of the invention is to provide a card transport system controlled in such manner that the business machine operator may, by the operation of account number selection keys, select for automatic delivery to the machine recording means or platen any desired one of a number of stacked cards.

In connection with the next preceding object, it is a further object to provide a card transporting and disposition system of a character such that the cards including both active and inactive account cards are kept in sequence with respect to account identification symbols or account numbers on the cards.

Another object of the invention resides in the provision of a by-pass for non-selected cards, controlled automatically in response to encoded account numbers on cards fed successively along a path enroute toward the recording means of a business machine.

Another object of the invention is to provide a card transporting and disposition control system in which the searching operation for a particular card is stopped following the by-passing of a certain number of inactive account cards as an indication of the possibility that an error has been made requiring the need for inspection.

Another object of the invention is to provide for the automatic by-passing and disposition of filled cards in such manner as to segregate them from the unfilled cards.

A further object of the invention is to provide an improved card transporting and distribution system of a character to sense and feed active account cards to a business machine and others to different points of distribution to reduce materially the responsibilities of the machine operator and opportunity for error.

Other objects of the invention will become apparent from the following description, taken in connection with the accompanying drawings in which:

FIG. 5 is a fragmentary enlarged view of a portion of the apparatus of FIG. 2;

FIG. 6 is an enlarged detail view of a portion of the mechanism of FIG. 4;

FIG. 7 is a fragmentary view of one type of record or ledger card that may be used with the accounting and card transport apparatus;

FIGS. 8, 9, 10 and 10A are diagrammatic views of the card transport system controls and circuitry therefor.

Figure 1:
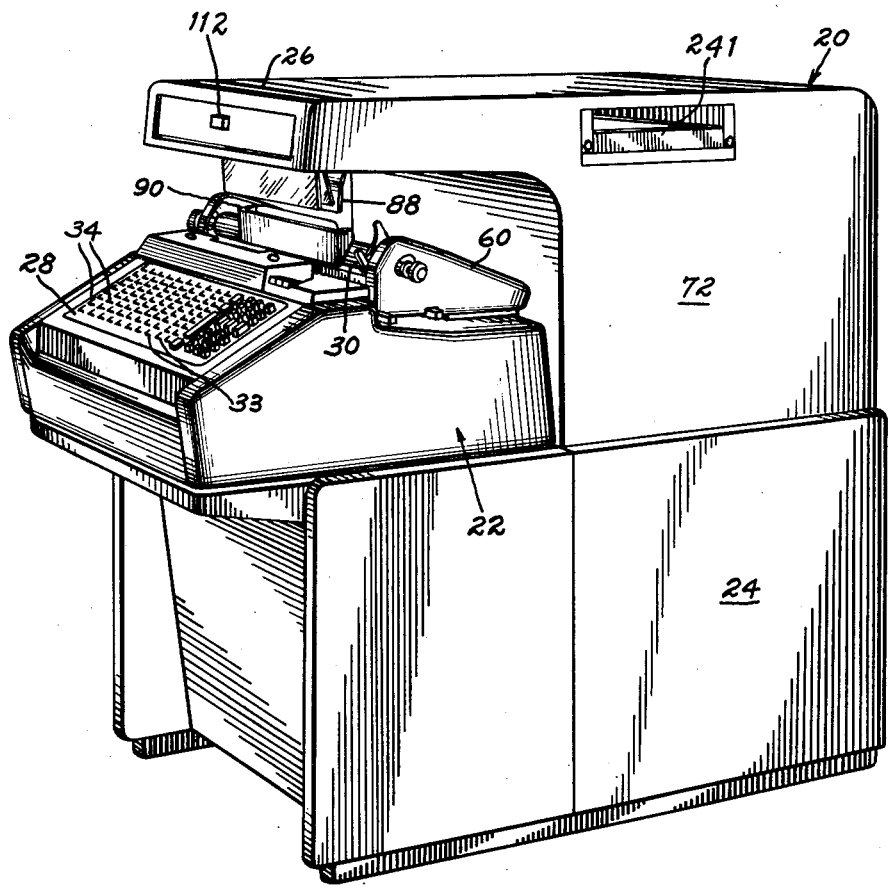
FIG. 1 is a perspective view of an accounting apparatus and our card transport system embodying features of the invention.
Figure 2:
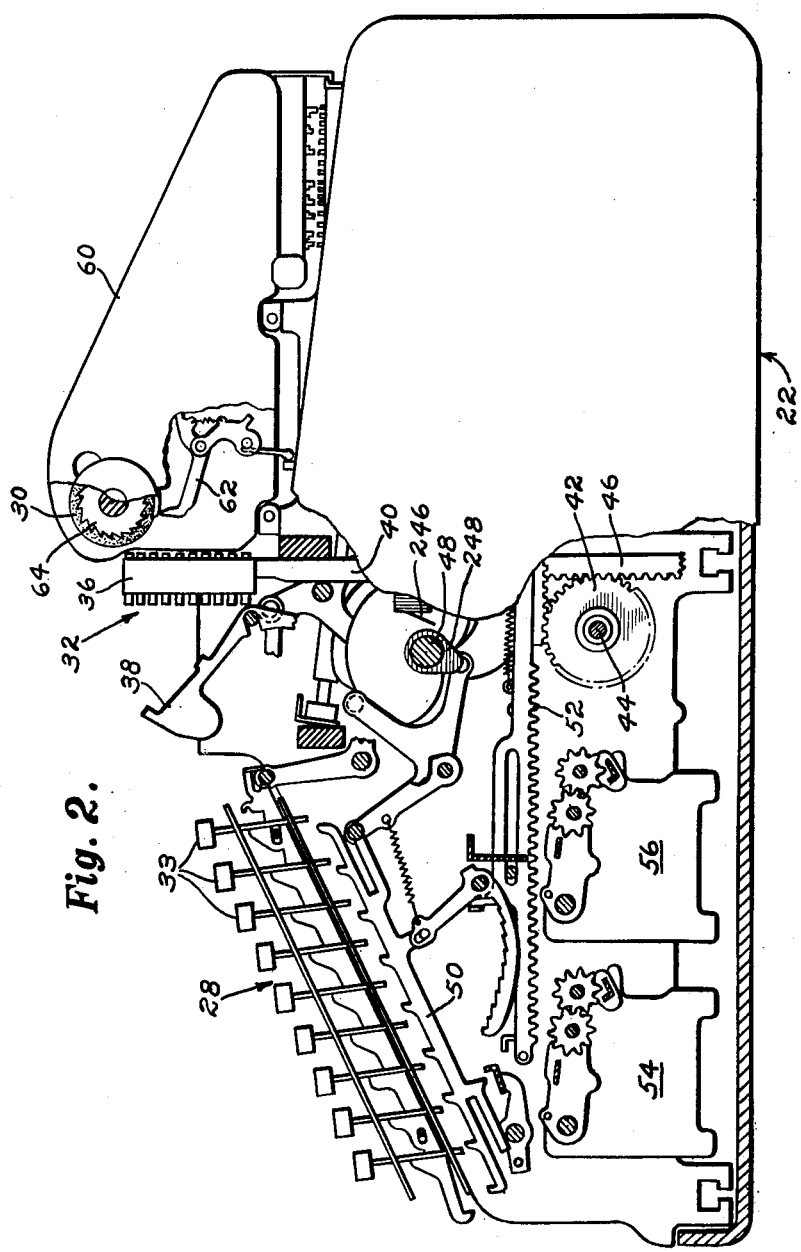
FIG. 2 is a side view partly broken away and in section of a business or accounting machine.

Referring to the drawings by characters of reference, the card transport system, designated generally by the numeral 20 is shown in FIG. 1 in association with a business or accounting machine 22. The card transport system 20 and the business machine 22 are preferably mounted on a stand or base 24 and arranged with the card transport system supported on the base behind the machine 22, as shown. An upper forwardly projecting portion 26 of the card transport system structure extends over the business machine 22 to transport cards thereto that require processing, and to convey the processed cards from the machine, and dispose of them in accordance with certain conditions hereinafter described.

The machine 22 is not herein shown or described in detail as any suitable business machine having some type of amount recording device may be associated with our card transport system 20, such as a typewriter, adding machine, accounting machine, etc. The machine 22 shown in connection with our transport system is an accounting machine of the type shown and described in detail in the pending application of Roy L. Phelan, S.N. 685,197, assigned to the same assignee as the present invention, and to which reference may be made for a thorough understanding of such machines. In general, the machine 22 includes the usual enclosed framework on which is mounted, among other components, a keyboard 28, a platen 30, and an amount recording or print mechanism 32. The keyboard 28 includes the usual rows of amount keys 33, machine function keys, motor bars, etc. In addition, there is provided on the present keyboard, two rows of account number selection keys 34 (see FIGS. 3 and 10) which, as will later be understood, make it possible for the machine operator to select desired cards for transport from a book or stack of such cards to the machine 22.

The printing mechanism includes a separate print head 36 for each row of the amount keys 33 and a separate print hammer 38 for each of the print heads 36. Secured to the upper ends of upright bars 40, the heads 36 are raised and/or lowered, respectively, by gears 42 on a horizontal shaft 44, the gears meshing respectively with gear racks 46 on the lower ends of the bars 40. A main cam shaft 48 is cycled on depression of a motor bar and raises the print heads 36, operates the hammers 38 and most of the other mechanisms of the machine. Below the keyboard are the usual key controlled amount slides 50, one for each row of amount keys, the slides being operatively connected respectively to amount racks 52 which operate the gears 42 to properly position the print heads with respect to a reference line on platen 30. Beneath the amount racks 52 and operated thereby, there is illustrated two crossfooters 54 and 56 for the storage of amounts printed by the printing mechanism.

The platen 30 is of the rotatable cylindrical type and may be mounted on a transversely movable carriage 60 or on a stationary support, as desired. Operatively connected to the platen 30 is an indexing mechanism including a pawl 62 and ratchet 64 for the usual line indexing or spacing operation, and as is well known, the line indexing mechanism is automatically operated by and during a cycle of operation of the machine 22, as shown and described in detail in the patent to Thomas M. Butler, No. 2,629,549.

An example of one type of ledger card that may be used with the present card transport system is shown in part in FIG. 7 and is completely shown and described in detail in the above mentioned patent application to Roy L. Phelan. In addition to a large, lined space allotted for the entry of amounts printed on the face of the card, there is provided on the back thereof three parallel stripes of magnetic material that may be encoded with information by polarizing bits of the magnetic material using a code, such as the modified binary decimal code (1, 2, 4, 7) illustrated. Of the three magnetic stripes shown on the card fragment view of FIG. 7, the stripe designated by the numeral 61 is employed to record information data, and the stripe designated by the numeral 63 to record the complement of the data. In practice, the two stripes 61 and 63 accommodate three kinds of information. For example, in FIG. 7, the information on the card is illustrated as being divided into digital positions with the first and second digital positions allotted to the encoding of the account number; and the digital positions remaining to the actual amount information. The third, magnetic stripe, designated by the numeral 65, is employed to record the last used line on the card and functions, as described in the Phelan application, to control automatic positioning of the card with reference to the printing mechanism. In the present invention, only the account number recording portions of the stripes 61, 63 and the line find stripe 65 have any significance, since only these affect the transport and disposition of the account cards.

The card transport system comprises, in general, a conveyor or card supply guideway 66, a conveyor or card guideway 68 associated with the platen and machine print mechanism 32, and a conveyor or card disposal guideway 70. The guideway 68 is mounted on the support or carriage 60, as the case may be, and has a common card entrance and exit 69 which communicatively connects the supply guideway 66 and the disposal guideway 70. Preferably, the guideways 68 and 70 together with other structure and controls therefor are mounted on a suitable supporting frame structure enclosed by a suitable housing 72.

The card supply guideway 66 has a lower rearwardly disposed inlet end 73 in communication with a card hopper 74 wherein the operator places a stack of cards to be processed, and extending upwardly and forwardly of the hopper has a downwardly curved forward end portion 75 provided with a downwardly directed card outlet 77 in communication by way of guides 88 and 90 with the common entrance and exit 69 of guideway 68. Also in communication with the entrance-exit 69 of guideway 68 is a downwardly directed inlet 92 of the card disposal guideway 70 by way of which a card enters guideway 70 after having been processed by the machine. The guideway 70 extends upwardly from its inlet 92 and near the top of housing 72 turns and extends rearwardly to discharge processed cards from an outlet 94 into a card receptacle or container 96 wherein the cards stack in the order in which they are received. Preferably, the container 96 is located directly above the card hopper 74 and both are preferably accessible by way of openings (not shown) in the rear wall of housing 72.

Figures 3, 4:
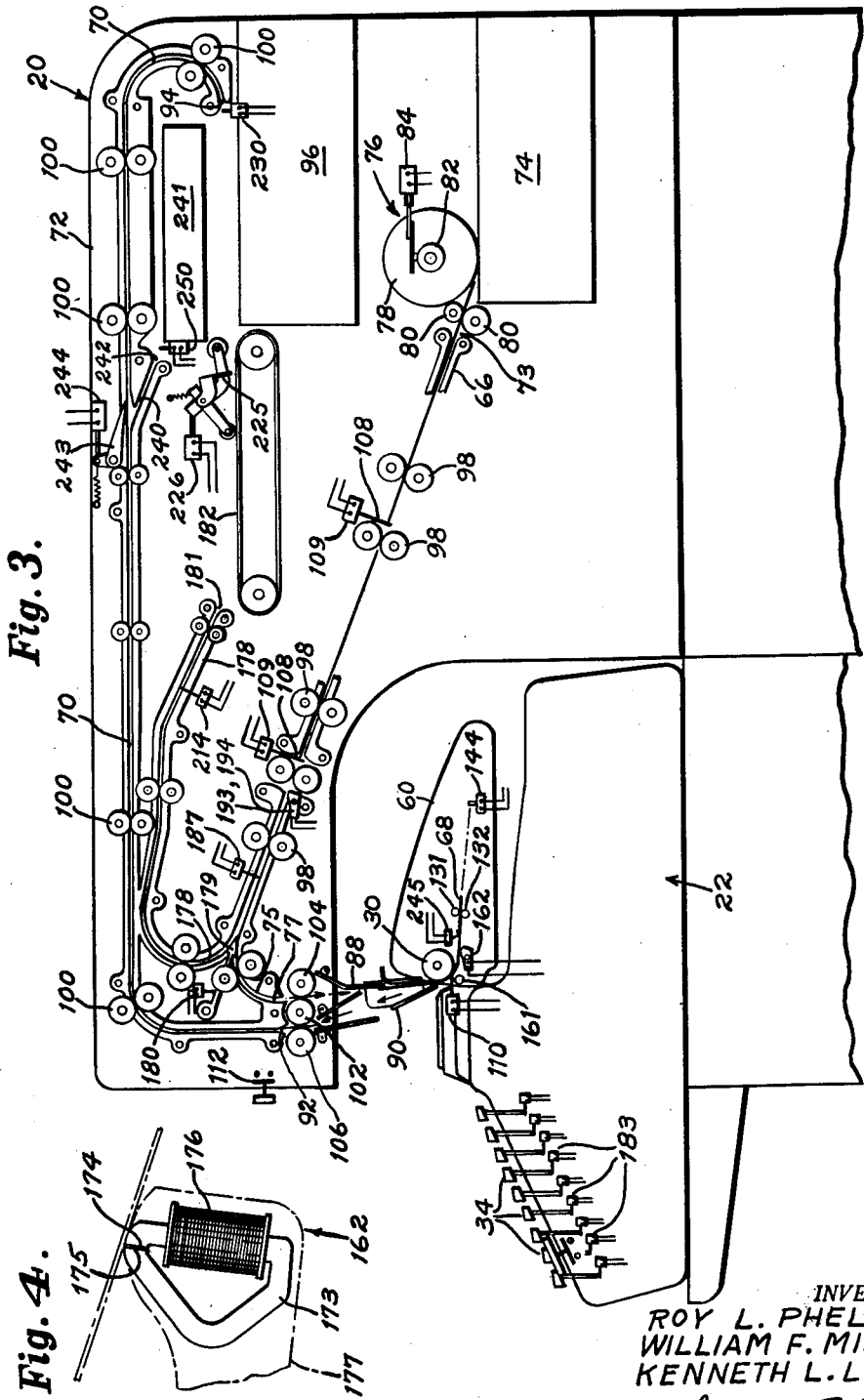
FIG. 3 is a side view partly diagrammatic of the accounting and card transport apparatus.
FIG. 4 is a side view of a transducer or read head of the card transport control sysystem.

Mounted directly above the hopper 74, there is a card feed device 76 which may be of any of the well known suitable types that are adapted to feed cards singly from a stack of cards in the hopper 74. In FIG. 3, the card feed device 76 is diagrammatically illustrated as comprising the type that includes a rotatable drum 78 connected in communication with the suction inlet of an air pump or associated vacuum tank (not shown). The drum 78 is provided around the periphery thereof with radially spaced apertures (not shown) that are successively presented to the top card of the stack in hopper 74 to pick up the card by suction and feed the card into the bight of a pair of feed rollers 80 that are located between the drum 78 and the inlet 73 of the card supply guideway 66. As is well known, suction type card feed devices have timed controls (not shown) for effecting the picking up of the top card and for discontinuing the suction effect on the card at the proper time to release the card, for example, to the feed rollers 80. Any other well known suitable type of card feed mechanism may be employed with the card transport system. An electric motor (not shown) may be used to rotate the card feed drum 78 and may be coupled to the shaft of the drum by a suitable clutch 82 actuated by a solenoid 84.

Spaced along the card supply guideway 66 are pairs of card conveyor or feed rollers 98 and along the card disposal guideway 70 are similar pairs of card conveyor or feed rollers 100. Mounted on the guideway structure at and between the downwardly directed card outlet 77 and card inlet 92, there is a driven shaft on which are fixed a number of axially spaced feed rollers 102 which are disposed between and drive similar pairs of idler rollers 104 and 106. The rollers 102, 104 and 106 have their axes in the same horizontal plane and are arranged with the bight of feed roller 102 and idler roller 104 in registry with card outlet 77, and with the bight of feed roller 102 and idler roller 106 in registry with the inlet 92 of the disposal guideway 70. Thus, rollers 102 and 104 cooperate to feed cards into guideway 68 and rollers 102 and 106 cooperate to feed cards leaving guideway 68 into the card disposal guideway 70. The card feed rollers 102, 98 and 100 may be belt driven from an electric motor (not shown) that preferably drives the rollers continuously during use of the machine. Spaced along the card supply guideway 66 is a plurality of card stop members 108 to prevent transport of the cards by the continuously operating feed rollers 98 when there is a card in the guideway 68 at the machine 22. The card stop members 108 are normally in their "down" or card restraining positions and are retracted or moved upwardly by and upon the activation of solenoids 109.

In accordance with one feature of the invention, the feeding of cards along the card supply guideway 66 is controlled, as above mentioned, in accordance with whether or not there is a card in the guideway 68 at machine 22 (see FIG. 8). To accomplish this, a normally open card actuated switch 110 is provided at the entrance-exit 69 of guideway 68 to control the card feed device 76 and the card stop members 108. The circuitry of the card feed device solenoid 84, card stop solenoids 109, and card actuated switch 110 is hereinafter described in detail.

A push button switch 112 is provided to start the card feed device 76 and raise the card stops 108 and includes a pair of normally open contacts 114, and from the positive side of the line from solenoid 84, the circuit includes a lead 118 that connects to one of the push button switch contacts 114 and a lead 120 to ground from the other of the push button switch contacts 114. A holding relay 121 is provided for the circuit of the push button switch 112 and is connected to lead 118 and by a lead 122 to normally closed contacts 123 of a control relay 124 which is connected by a lead 125 to the normally open contacts of card actuated switch 110. The holding relay 121 has a pair of contacts 126 connected across leads 118 and 120 by a lead 128. When push button switch 112 is closed, a circuit will be completed from the positive side of the line through solenoid 84, lead 118, push button contacts 114 and lead 120 to ground. At the same time, a circuit is completed from the positive side of the line through the normally closed relay contacts 123, relay 121, push button contacts 114 and lead 120 to ground. Thus, by closing the push button switch 112, the card feed controlling solenoid 84 and holding relay 121 are energized provided that switch 110 is open. When a card enters the guideway 68 at the machine 22 and closes switch 110, the control solenoid 124 is energized to open contacts 123 in the holding circuit of relay 121 which breaks the circuit of and de-energizes the card feed control solenoid 84 and card stop solenoids 104 to stop the feeding of cards along card supply guideway 68.

Mounted on the support 60 rearwardly of the platen 39 is a second card feed mechanism 129 including a driven transverse shaft 130 fixed onto which is a plurality of axially spaced card feed rollers 131 of which only one is shown. Below and engageable with the feed rollers 131 are axially spaced idler rollers 132 on a shaft 133, the feed and idler rollers being arranged at an opening in guideway 68 such that the bite of the rollers is in the plane of the guideway to receive the lead edge of a card presented thereto. An electric motor 134 is employed to drive the feed roller shaft 130, and the motor and shaft 130 are operatively connected by a gear mechanism, designated generally by the numeral 135. The gear mechanism 135 comprises essentially a bevel driving gear 136 on the drive shaft of the electric motor 134, and a pair of oppositely disposed driven bevel gears 137 and 138 in mesh with gear 136. The driven gears 136 and 137 are on a shaft 139 which drives the feed rollers 131 through a suitable pinion gear 140. On shaft 139, between gears 137 and 138, is a slidable shifter or clutch member 141 that is normally in mesh with gear 138 to drive rollers 131 in a direction to feed a card forwardly along guideway 68, and the clutch member 141 is shiftable into mesh with gear 137 to reverse the drive to feed the card rearwardly along guideway 68. A solenoid 142 is provided to move the shifter 141, the solenoid armature, as at 143, being adapted to function as the shifter arm for the clutch. A card actuated switch 144 located at the rear end of guideway 68 controls the solenoid 142 in conjunction with card actuated switch 110. For a more detailed description of the mechanism for driving the card feed rollers 130, reference may be had to the copending application to William W. Deighton et al., S.N. 598,454, assigned to the same assignee as the present invention.

As previously mentioned, the card actuated switches 110 and 144 mutually control the card feed mechanism 129, the circuit of switch 110 including a pair of normally open contacts 145 of control relay 124 and the contacts 145 being connected to the motor 134 by leads 146 and 147 and to switch 144 by a lead 148. Further, the circuit includes a lead 149 that connects the switch 144 to a pair of normally closed contacts 150 of a holding relay 151, the contacts 150 being connected by a lead 152 to the gear shifter solenoid 142. This circuit provides for actuating the shifter 141, when a card closes switch 110, to engage gear 137 so that rollers 131 will be driven in a direction to feed the card rearwardly along guideway 68. The card actuated switch 144 also has a pair of normally open contacts 153 and 154 of which contact 153 is connected to the positive side of the line and the other contact 154 of which is connected by a lead 155 to the coil of relay 151. Also, the contact 154 of switch 144 is connected by a lead 156 to a pair of normally open holding contacts 157 of relay 151, the holding circuit including a lead 158 that connects the contacts 157 to lead 147 and thus to the control relay contacts 145. The holding circuit is from the control relay contacts 145, leads 146, 147 and lead 148 through the holding contacts to the coil of relay 151. From the above, it will now be apparent that when a card enters the guideway 68, the switch 110 is closed by the card which starts motor 134 and also energizes solenoid 142 so that shifter 141 moves to engage gear 137 to cause rollers 131 to feed the card rearwardly along guideway 68. Further, it will be seen that when the switch 144 is moved away from its normally engaged contact by the rearwardly moving card, the switch 144 is moved into engagement with and bridges contacts 153 and 154. The breaking of switch 144 with its normally engaged contact de-energizes the solenoid 142 which allows the spring on armature 143 to move the shifter 141 back to the normal position shown to cause the feed rollers 131 to reverse their direction of rotation and feed the card forwardly. The closing of contacts 153, 154 closed a circuit from the positive side of the line through contacts 153, 154 and through lead 155 to energize the relay 151 which then opened its contacts 150 of solenoid 142 and closed the holding contacts 157 to keep the solenoid de-energized, following release of switch 144 by the forwardly moving card. The holding circuit is from the now closed control relay contacts 145 through leads 146, 147, 148, 158, the holding contacts 157 and lead 156 to relay 151.

Mounted on a transverse shaft 160 near the platen 30 are axially spaced pressure rollers 161 adapted to cooperate with the platen 30 to hold an account card therebetween. The platen 30 is mounted such that it is movable bodily away from the pressure rollers 161 to the position shown in FIG. 5, commonly referred to as the open position of the platen. In this position of the platen 30, a card can be freely fed between the platen 30 and feed rollers 161 into the bight of feed rollers 131, 132. The platen 30 is moved between its closed and open positions by mechanism that is time actuated from other mechanism of the machine 22, the platen normally being in open position. The mechanism for moving the platen 30 to its open and/or closed positions is not herein shown or described in detail as such mechanism constitutes no part of the present invention and is completely disclosed in the above mentioned patent to Thomas M. Butler, No. 2,629,549.

An electrical transducer or read device 162 is located adjacent the guideway 68 between the platen 30 and the feed roller 131 in position to sense the magnetically encoded line find stripe 65 on a card passing forwardly along the guideway 68, and effect the stopping of the card at a position such that the next available blank space on the card is in printing position relative to a reference line on platen 30. The read device 162 responds to the line find information on card stripe 65 to control a relay 163 which has a pair of normally closed contacts 164 in lead 147 and thus in circuit with motor 134 and gear shifter solenoid 142, and has a second pair of normally open holding contacts 165. The circuit of the read device 162 and the relay 163 includes a pair of normally open contacts 166 of relay 151 connected by a lead 167 to one terminal of the transducer 162 which has its other terminal connected by a lead 168 to the relay 163. In lead 168, there is preferably provided an amplifier 169 to amplify the pulse and also determine the direction of current flow in the circuit. The holding circuit of relay 163 includes a lead 170 that connects the holding relay contacts 165 to the positive side of the line, and in lead 170 is a normally closed push button switch 171 by means of which to break the holding circuit. When the card is being moved forwardly by the feed roller 131, it will be recalled that relay 151 will be energized and thus contacts 166 will be closed so that when the card passes over and the read device 162 senses the change in polarity of the magnetic stripe 65, the relay 163 will be energized and break contacts 164 to stop the further feeding of the card by the feed device 129. Also, the relay contacts 165 will be closed to hold the card feed device circuit broken until push button switch 171 is operated to break the holding circuit of relay 163. After the card has been processed by the machine 22, the operator presses the push button switch 171 which again starts the card feed motor 134 and energizes the gear shifter solenoid 142 to effect rearward movement of the card. During this rearward movement of the card, the read device 162 will not respond to the magnetic stripe 65 on the card, since the contacts 166 of relay 151 are now open. The card again actuates switch 144 and the direction of card feed is reversed as above described and the card is fed forward and this time is ejected from the guideway 68 into the card transport disposal guideway 70. During the forward movement of the card, the read device 162 will not stop the card in response to the line find information on the stripe 65 for the reason that during this time the read device 162 is functioning to write information on the stripe, as described in detail in the Phelan application.

The read device 162 comprises a generally D-shaped armature 173 (see FIG. 4) constructed of laminations of any suitable thin magnetizable material. An air gap 174 is provided between the pole pieces of the armature 173. As is conventional practice, during fabrication of such read devices, a silver shim 175 is positioned in the air gap 174 of the armature 173 to divert the magnetic flux outwardly around the outer edge of the shim 175. An electrically conductive energizing winding 176 is provided on one leg of the armature 173 and the assembly is preferably shielded by embedding it in a body 177 of plastic material. The air gap 174 is exposed by grinding away the plastic material in the area of the pole pieces so that the pole pieces at the air gap may be positioned to contact the encoded stripe 65 of an account card passing along the card guideway 68.

In practice, where an accounting machine of the type shown by the Deighton or Phelan applications is associated with our card transport system, two additional transducers (not shown) will be used including a data transducer for association with the data stripe 61 and a complement transducer for association with the complement stripe 63. When a new account card is prepared, the account number is encoded on the magnetic stripes 61 and 63, by the corresponding transducers and associated electrical components, as described in the above mentioned Deighton and Phelan applications. Also when the new card is prepared, the transducer 162 functions to polarize the magnetic material of the line find stripe 65 along the entire length thereof in a positive direction. After entries are made on the card by the machine 22, the transducer 162 functions to change the polarity of the magnetic material of stripe 65 during the writing cycle described in the Deighton application so that at the last entry on the card, there will be a polarity line of demarcation indicative of the last line used, or the next available blank line on the card. This is commonly known as the line find information on stripe 65 and when the card is next delivered to the machine, the read device 162 will respond during the reading cycle described in the Deighton application to the polarity change and stop the card feed rollers 131 to effect automatic positioning of the card with the next available blank line of the card in printing position. In the interests of simplicity of the disclosure of the present invention, the various devices that cooperate with the data transducer and the complement transducer in the writing and reading of information on the card stripes 61 and 63 have not been shown or described in detail since they constitute no part of the card transport system and are completely disclosed in the Deighton and Phelan applications.

In accordance with another feature of the invention, there is connected in communication with the card supply guideway 66, a branch or by-pass guideway 178 to by-pass the guideway 68 so that cards, the accounts of which are inactive, can be transported directly to the card container 96. At the intersection of the by-pass 178 with the guideway 66, there is provided a card deflector member 179 that is pivoted on the guideway structure and is actuated by a solenoid 180. Normally the deflector member 179 is in the position shown in FIGS. 3 and 5 to deflect inactive account cards to the by-pass 178. In the present construction, the by-pass 178 extends upwardly from its inlet and then rearwardly below guideway 70 to a downwardly inclined portion which has an outlet end 181 arranged to discharge cards onto a horizontal conveyor 182 that constitutes a part of the by-pass and is in turn arranged to discharge cards into the card stacking container 96.

In order to control the by-pass 178 so that active account cards will proceed to the guideway 68 at machine 22 and inactive account cards to the by-pass 178, there is provided a plurality of selectively operable controls or switches 183 (see FIGS. 10 and 10A) by means of which to select a card for transport to machine 22, and a pair of controls or relays 185, 186 which are responsive to the encoded account numbers on cards passing along guideway 66, the selective switches and the relays mutually controlling the card deflector 179.

In the illustration of FIG. 10, there are two rows, "a" and "b," of the account number switches 183 of which the switches of row "a" represent the higher or tens order of the digits. The switches 183 are arranged beneath the keyboard for respective actuation by the account number keys 34, the keys being of the well known latch down type that are releasable by the main camshaft of machine 22 at a desirable point of the cycle of operation of the camshaft. As designated, the switches 183 of each row are electrically representative of the decimal digits 1 to 9, respectively. Further, the switches 183 of each row are serially connected and the rows of switches are connected in parallel and by a lead 184' to the positive side of the line to which the card deflector operating solenoid 180 is also connected.

A pair of matrix or whiffle tree switching units A' and B' are provided and are connected by conductors, respectively, to the rows "a" and "b" of keys 183, the whiffle tree units each having a number of pairs of contacts of the relays 184 and each having the controls 185, 186 as terminal relays, respectively. These relays 185 and 186 are the controls which respond to the symbols on the cards passing along guideway 66 and control mutually with the selected ones of the switches 183, the card deflector member 179. The relay 185 has a pair of normally open contacts 185' in series with the switches of the row "b" of switches and has a pair of normally closed contacts 185" in series with the switches 183 of the row "a" of switches. As shown in FIG. 10, the sets of contacts 185' and 185" are in parallel. Also, the relay 185 has a pair of contacts 185''' connected in series with and between relay 186 and the one bit contacts of the B' whiffle tree unit. With reference to FIG. 10A, the relays 184 are provided with a pair of sensing elements or read devices 193, 194 which are mounted on the card supply guideway 66 in position to respond to the magnetically encoded account numbers on cards passing along the guideway. The read devices 193, 194 may each be of the same construction as the previously described read device 162 and are located to read respectively the data stripe 61 and the complement stripe 63 on the cards.

Operatively connecting the read devices 193 and 194 and the relays 184 is a pulse distributor 190 which is diagrammatically illustrated as comprising a rotatable stepper switch 195 and a plurality of radially spaced contacts 196. One end of the coil of the data responsive read device 193 is connected to the stepper switch 195 by a lead 197 and through a diode 198 to a solenoid 199 that is pulsed to operate the stepper switch 195, and the corresponding end of the coil of the complement responsive read device 194 is connected by a lead 200 to the coil of the solenoid 199. In each of the leads 197 and 200, there is provided an amplifier 201 and 202, respectively. The stepper switch 195 is rotated in the direction of the arrow one step whenever either of the read devices 193 and 194 acts to pulse the solenoid 199. The fixed contacts 196 of the stepper switch 195 are respectively connected by conductors to the eight relays 184.

A start read switch 187 is mounted on the structure of guideway 66 posteriorly to the read devices 193, 194 with respect to the direction of card travel and is a normally open switch that is arranged to be actuated and held closed by and as a card moves into position for reading by the read devices 193, 194. The switch 187 is spaced from the read devices 193, 194 a distance such that the switch is closed at the proper time for the read devices 193, 194 to start reading the encoded account numbers on the magnetic stripes 61 and 63. Closing of the switch 187 energizes a relay designated RS that has a pair of normally open contacts RSa in lead 184'. Also, the relay RS has a pair of normally open contacts RSb in a circuit including a pair of holding relays 188 and 188', respectively, for the contacts 185' and 186'. Further, the relay RS has a pair of normally open contacts RSc in circuit with the read devices 193 and 194. Collectively represented by the numeral 189 is a plurality of hold relays for the storage relays 184 and in the circuit of the hold relays is a set of contacts RS*d* of the relay RS. The relay 186 has a pair of normally open contacts 186′ in series with solenoid 180 and between the solenoid and contacts RS*a*.

In operation of the card selecting system, assume that the operator closed the digit "3" switch in the *"a"* row of switches and the digit "8" switch in the *"b"* row of switches to call for transport to guideway 68 of the account card bearing the encoded account number "38." With these switches closed, when the card having the account number sought is fed along the guideway 66 and closes the start read switch 187, the complement read device 194 responds to the encoded "7" bit and then to the encoded "4" bit on stripe 63 and pulses the solenoid 199 to move the stepper switch 195 accordingly to the contact corresponding to the "2" bit. This stepping of switch 195 will not close any circuits since as previously mentioned, the complement read device 194 functions only to step the switch. As the card proceeds along guideway 66, the information read device 193 responds to the encoded "2" bit and then the encoded "1" bit on a stripe 61 of the card and energizes the corresponding ones of the relays of group A which closes the contacts shown in dot and dash lines of the whiffle tree A′. The stepper switch 195 has now been moved to the "7" bit contact and the operation is repeated in response to the "7" bit and "1" to energize the corresponding ones of the relays 184 of group B and as a consequence, closing the contacts shown in dot and dash lines in the whiffle tree unit B. The closing of the "1" and "2" bit pairs of contacts of whiffle tree unit A′ completes the following circuit to energize relay 185. From the positive side of the line through the now closed relay contacts RS*a*, lead 184′, contacts 185″, the three digit one of the switches 183 and through one of the pairs of the "2" bit contacts and the pair of "1" bit contacts to relay 185. Since the contacts RS*b* are closed, the hold coil 188 is energized to hold relay 185 energized. At the same time, the energization of relay 185 opened contacts 185″ and closed contacts 185′ and 185‴. The circuit is now completed from the positive side of the line through the now closed contacts 185′, the number eight digit one of the switches of row *b*, through the "7" and "1" bit closed contacts of the whiffle tree unit B′ to the relay 185‴. The energization of relay 185‴ closes its contacts 186′ which energizes solenoid 180 and moves the card deflector 179 to direct the card to the guideway 68 at the machine 22. When the card releases the switch 187 the solenoid RS is de-energized, which opens contacts RS*a* to de-energize solenoid 180 and allow the card deflector 179 to return to the normal position shown. Also the contacts RS*b* open to break the holding circuits of relays 185 and 186, and RS*c* opens to disable the circuit of the read devices 194, 193, and contacts RS*d* open to break the holding circuits of the relays 184.

As it is possible for the machine operator to index the wrong account number in operating the account number keys and which would, of course, result in all of the cards by-passing the guideway 68, a counter operated switch 204 is provided to stop the feeding of cards along the card supply guideway 66 after a predetermined number of cards have been by-passed. The stopping of the feeding of cards by the counter operated switch 204 is an indication to the machine operator that an error has been made, possibly in the indexing of the account number of keys 34, and that inspection should be made before proceeding further, so as to avoid the loss of time that would occur if the machine were allowed to operate until all cards were by-passed. The counter actuated switch 204 is diagrammatically illustrated in FIG. 8 as comprising, in general, a rotatable stepper contact 206 carried by a ratchet wheel 208 and a plurality of radially spaced contacts fixed onto a dielectric mounting member or disc. A pawl 210 actuates the ratchet wheel 208 and is operated by the pulsing of a coil of a solenoid 212 to the armature of which the pawl is pivoted. In the usual manner, the pawl 210 is guided by a cam to which the pawl is connected by a link, as shown, so that following each stroke, the pawl disengages from the ratchet wheel, as illustrated. The coil of solenoid 212 is pulsed by and upon the closing of a card actuated switch 214 that is positioned along the by-pass 180 in the path of cards passing therealong (see FIG. 3). A relay 216 is controlled by the counter actuated switch 204 and has a pair of normally closed contacts 218 in the lead 118 of the circuit of the card feed device 76 and card stops 108. The coil of relay 216 is connected at one end thereof to the stepper switch contact 206 and at the other end to one of the fixed contacts of the stepper switch. Although the coil of relay 216 is illustrated as being connected to a number 5 fixed contact of the stepper switch, such stepper switches, as is well known, have adjustable means for setting them to close at any desired count. Fixed to the ratchet wheel 208 is a gear 219 in mesh with a gear rack 220 for returning the stepper switch contact 206 to its starting position. A solenoid 222 actuates the gear rack 220 and is connected by a lead 224 to the fixed contact of the card actuated switch 110 whereby the counter actuated switch 204 is reset in response to the entrance of a card into the guideway 68 at the machine 22. This arrangement provides for the automatic resetting of the counter at any count up to four if the counter is set to operate at the count of five by-passed cards. Connecting relay contacts 126 and lead 224, there is a lead 223 that connects the counter reset solenoid 222 in circuit with the push button switch 112. This provides for the resetting of the counter following the by-passing of five cards.

Directly above the conveyor 182 is provided a control member or gate 225 which functions under certain conditions to intercept cards on conveyor 182 to prevent them from discharging into container 96 until a previously fed card which, for example, may be enroute along guideway 70 from the machine 22, has been delivered to the card container 96. The gate 225 is pivotally mounted on the guideway structure and is normally biased to open or retracted position, as shown in FIGS. 3 and 8. A solenoid 226 is operatively connected to and for actuating the gate 225 and is controlled mutually by the push button switch 112 having a second pair of contacts 228 and by the card actuated switch 110. A holding relay 229 is provided for the solenoid 226 and is de-energized by the opening of a normally closed card actuated switch 230 that is located between the outlet end 94 of guideway 70 and the card container 94. The circuitry of the gate actuating solenoid 226 includes a lead 231 from one of the push button contacts 228 to the contacts 145 of the control relay, and by a lead 232 from the other end of the push button contacts 228 to one end of the holding relay coil 229 which is connected to the card actuated switch 230 by a lead 233. Thus, it will be seen that when there is a card in the guideway 68, the contacts 145 of control relay 124 will be closed and if the push button switch contacts 228 are closed, the following circuit will be completed to relay 229. From the control relay contacts 145, through lead 231, push button contacts 228, lead 232, relay 229, lead 233, and through the normally closed card actuated switch 230 to ground. The holding relay 229 has a pair of normally open contacts 235 which are connected by a lead 236 to the coil of the solenoid 226. When the solenoid 226 is energized, it lowers the gate 225 to intercept a by-passed card until a card, processed at the machine 22 first reaches the card container so as to keep the cards in the desired order with respect to their account numbers. When the card from the machine reaches the container 96 and actuates switch 230, the holding circuit of relay 229 is broken which allows the gate 225 to retract and the intercepted card to proceed into the container 96.

A by-pass 240 is provided to by-pass the container 96 so that a filled card can be sent from the guideway 68 at machine 22 to an auxiliary container 241 (see FIG. 9). The by-pass 240 has its inlet end intersecting the guideway 70 and inclining downwardly therefrom has a discharge end 242 positioned to direct cards into the auxiliary card container 241. A control or card deflector member 243 is pivotally mounted on the guideway structure at the intersection of the by-pass 240 and guideway 70 to control the disposition of cards, the deflector member 243 being normally in position to allow unfilled cards to proceed to container 96. The deflector member 243 is actuated by a solenoid 244 and is mutually controlled by a card actuated switch 245 and a timed control switch 246. The switch 245 is located at the guideway 68 and has an operating arm 247 that is positioned to ride on a card as illustrated in FIGS. 5 and 9, the switch being a normally closed type adapted to be held open by a card guideway 68. The other switch, or switch 246 is located adjacent the main camshaft 48 of the machine 22 and is a normally open switch that is closed by a cam 248 when the cam shaft rotates to cycle the machine. The card actuated switch 245 is spaced from the reference printing line on the platen 30 and with respect to the length of the cards such that when the card is indexed to the last printing line or space thereon, the switch 245 rides off of the trailing edge of the card and closes and when the other switch 246 is closed by cycling of the machine 22, a circuit is completed to solenoid 244 to move the deflector member 243 to the by-pass deflecting position.

In the interests of transporting the cards such that they are stacked in the container 96 in numerical order with respect to their account numbers, a card actuated switch 250 is provided at the outlet 242 of by-pass 240, and is electrically connected to solenoid 158 to control gate 156. The circuitry of the deflector actuating solenoid 244 includes a holding relay 251 having a pair of normally open contacts 252 and a pair of normally holding contacts 253. The relay 251 and switches 246, 247 and 250 are connected in circuit from the positive side of the line by leads 254, 255, 256 and lead 257 to ground. A lead 258 connects the deflector operating solenoid 244 to one of the relay contacts 252 and a lead 260 connects the other of the contacts 252 to lead 257 and thus to ground. The holding contacts 253 are connected by a lead 261 to ground and by a lead 262 to lead 255. When both of the switches 245 and 246 are closed, relay 251 will be energized and close its contacts 252 and 253. The closing of contacts 252 energizes the solenoid 244 which then pivots the card deflector 243 clockwise, as seen in FIG. 9, in position to deflect a card into by-pass 240. The closing of the relay contacts 253 established a holding circuit which includes the card actuated switch 250, lead 254, relay 251, lead 262, holding contacts 253 to lead 257 and thus to ground. This holding circuit holds relay 251 energized after cam 248 releases switch 246. When a card passing from the by-pass 240 to the filled card container 241 strikes and opens switch 250, the holding circuit of relay 251 is broken which de-energizes the solenoid 244 and as a consequence allows the card deflector member 243 to return to its normally raised position. As previously mentioined, the card actuated switch 250 also controls the gate 225 to effect the raising of the gate following the opening of card actuated switch 250. To accomplish this, a relay 264 (see FIG. 8) is provided and has a pair of normally closed contacts 265 in lead 233 of the holding circuit of relay 229 whereby when relay contacts 265 open, relay 229 will open to de-energize solenoid 226. This will allow the gate 225 to raise so that a card intercepted thereby may proceed to the container 96. The relay 264 is connected by a lead 266 to lead 233 and by a lead 268 to lead 254 and thus to the card actuated switch 250 (see FIG. 9). It will be seen that the provision for retracting the gate 225 when a filled card enters container 241 insures the maintaining of the cards in the desired order. For example, if gate 225 was not released upon the entrance of a filled card into the container 241, the next card enroute to container 96 via guideway 70 would enter container 96 ahead of the gate intercepted card and the latter card would, of course, be out of order.

*Operation*

Assuming that the card feed rollers 80, 98, 100 and 102 are operating and that a book of account cards in numerical order with respect to their encoded account numbers is in the hopper 74, the machine operator first depresses the desired account number selection keys 34 corresponding to the two digit number on the card desired to be delivered to machine 22 and then presses the push button switch 112 to start the card transport system. Closing of the switch 112 energizes the hold relay 121 through the normally closed contacts 123 of relay 124, the contacts 123 being closed when switch 110 is open, that is, when there is no card in guideway 68. The relay 121 now energized closes its contacts 126 and establishes a circuit from the positive side of the card feed device solenoid 84 through the card stop solenoids 109, the normally closed counter controlled switch 216 and through the contacts 126 of relay 121 to the negative or ground side of the line. Cards are now fed by the feed device 76 from the hopper 74 to the bite of card feed rollers 80 and are fed along the card supply guideway 66 by the succeeding pairs of rollers 98. When the first card passes over the read heads 193, 194 and closes switch 187, the encoded account number on the card is read by the read devices 193, 194 and assuming that it is not the desired card, circuits will not be completed through the storage relays 184. As a consequence, the main by-pass card deflector solenoid 180 will not be energized and so the deflector 179 will remain in normal position to deflect the card to the by-pass 178 along which the card will travel to the conveyor 182, past the normally open gate 225 and into the card container 96. While the first card is being by-passed, the next fed card is fed past the read heads 193, 194, and assuming that the second card is the one desired by the operator, the closed contacts of the storage relays 184 will match or be in closed series circuit with the corresponding ones of the indexed switches 183 as hereinbefore described so that when the start read switch 187 is closed by the card, the solenoid 180 will be energized and the card deflector 179 moved to allow the card to proceed into the guideway 68 of machine 22. As the card enters the guideway 68, the card actuates the switch 110 which energizes relay 124 opening relay contacts 123 which breaks the holding circuit of relay 121 to stop the card feed device 76 and to release card stops 108 to stop the further feeding of cards along the guideway 68. Also, the energizing of relay 124 closes contacts 145, closing the circuit of and starting the motor 134. This circuit is from the positive side of closed contacts 145, lead 146, the normally closed contacts 164 of holding relay 163 and through motor 134 to ground. At the same time that the motor 134 is energized, the gear shifter solenoid 142 is energized to move shifter 141 into mesh with gear 137, the circuit being from motor lead 147, lead 148, limit switch 144, lead 149, relay contacts 150 and through solenoid 142 to ground. This changes the direction of feed of the normally forwardly feeding rollers 131 so that they now feed the card rearwardly along guideway 68 until the card actuates the rear limit switch 144. When this occurs, the switch 144 breaks the circuit of solenoid 142 and engages contacts 153, 154 which energizes the relay 151. The opening of switch 144 by the card de-energized solenoid 142 which allowed the solenoid armature spring to move shifter 141 into mesh with gear 133 so that feed rollers 131 now feed the card forwardly, and energization of relay 151 opened its contacts 150 and closed its contacts 157 and 166. The closing of contacts 157 holds the relay 151 energized following release of switch 144 by the forwardly moving card and the closing of contacts 166 renders the read device 162 effective to read.

When the forwardly moving card passes over the read device 162, the device responds to the line find information on the magnetic stripe 65 and energizes relay 163 which opens its relay contacts 164 and closes contacts 165, the latter being closed to hold the relay energized. The opening of relay contacts 164 opens the circuit of motor 134 to stop forward feed of the card in position corresponding to the line find information, or such that the last available printing space on the card is at the reference print line on the platen 30. Also, the opening of contacts 164 opens the holding circuit of relay 151 and as a consequence relay contacts 150 close and contacts 159 and 161 open. With the card stopped in proper position with respect to the line find information, the operator now initiates operation of machine 22 which as previously mentioned automatically moves the platen 30 toward its pressure rollers 161 to grip the card tightly therebetween and the operator then proceeds to process the account on the card which process may be posting, listing, typing or any other operation.

Upon completion of the processing of the last item to be entered on the card, the machine operator presses button switch 171 which breaks the holding circuit of relay 163, allowing contacts 165 to open and contacts 164 to close whereby motor 134 is again started and shifter solenoid 142 is energized through the new closed relay contacts 150 to cause the card feed rollers 121 to feed the card rearwardly along guideway 68 until the card again opens the rear limit switch 144. When this occurs, the solenoid 142 is again de-energized to reverse the direction of card feed and the card is fed forwardly and ejected from guideway 68 to the disposal guideway 70. During the forward movement of the card, the read device 162 functions as described in the Deighton and Phelan application, to write the new line find information on the line find stripe 65 so that the next time the card is transported to the machine, the read device 162 will respond to the new line find position and stop the card in the proper position with respect to the platen. Since it was assumed that the ejected card was an unfilled card, this card will proceed along the disposal guideway 70 to the card stacking container 96. Thus, active account cards will be transported to the guideway 68 for processing by machine 22 whereas inactive account cards will be transported through the by-pass 178, by-passing the machine guideway 68 and proceeding directly to the container 96.

Upon ejection of the card from the machine, switch 110 is released by the card and parting from contact 114 de-energizes relay 124 which opens contacts 145 and closes contacts 123. The opening of contacts 145 stops motor 134 and the closing of contacts 123 conditions the circuit of the card feed holding relay 121 so that the card feed device 76 will start to feed cards when the starter switch 112 is again depressed.

If the next card read by the read devices 193, 194 is an inactive account card, it is by-passed and this card could arrive at the container 96 ahead of the preceding card ejected from the machine. However, when the operator depresses the starter switch 112, following ejection of the active account card from the machine, contacts 228 were bridged to complete a circuit to solenoid 226 which closed gate 225 to intercept the by-passed card. When the card from the machine, enroute along guideway 70 is about to enter container 96, the card actuates switch 230 which breaks the circuit of holding relay 229, thus allowing the gate 225 to raise and the by-passed card to proceed to container 96 in proper order behind the card that actuated switch 230.

In the situation where a card being processed in the machine is moved upwardly by the platen 30 to the last printing space on the card, the operating arm of switch 245 (see FIG. 9) will have ridden off of the trailing edge of the card, allowing the switch to close, and when the machine 22 is cycled to print on the last line of the card, the switch 246 will be closed by timing cam 248. When switch 246 is closed, a circuit will be made through the holding relay 251 and the limit switch 250 which will close both sets of the relay contacts 252, 253. The closing of contacts 252 will energize solenoid 244 to move the card deflector member 243 in position to deflect the card into the filled card container 241. The operator now presses the last item push button switch 171 which, as in the case of an unfilled card causes feed rollers 131 to feed the filled card rearwardly along guideway 68 until the card strike limit switch 144 whereupon the direction of feed is reversed and the card is then ejected from guideway 68 into the card disposal guideway 70 and proceeds to container 241.

As the card enters container 241, the card actuates limit switch 250 which de-energizes the holding relay 251 to open the circuit of solenoid 244 and allow the deflector member 243 to return to its normal position shown in FIG. 9. At the same time, the opening of limit switch 250, de-energized relay 224 (see FIG. 8) which broke the holding circuit of relay 229 and de-energized solenoid 226 to allow the gate 225 to move to its raised or ineffective position shown. Thus, if a by-passed card, preceding a filled card, is being intercepted by gate 225 when the switch 250 is actuated, then gate operating solenoid 226 will be de-energized to allow the gate 225 to retract and the card to proceed into container 96.

When an operator, having placed a book or stack of cards in hopper 74, starts the card feed device 76 and an unusual number of cards by-pass the machine 22, there is a possibility that the operator has placed the wrong stack of cards in the hopper, or has the wrong group of checks and deposit slips, or simply has indexed the wrong account number on the keyboard. In any event, the continued by-passing of cards is prevented by the counter operated switch 216 which after a number of cards have passed thereby will stop the card feed device 76 to permit the operator to check for errors. The counter operated switch 216 can be set in accordance with the machine operator's knowledge of the approximate number of active account cards in a given stack. Thus, the counter actuated switch 216 serves to save time by stopping the machine instead of allowing the machine to continue operation until all cards in the hopper 74 have been by-passed to the container 96.

From the foregoing description, it will now be appreciated that we have provided for use with a business machine, an improved record card transport apparatus which eliminates the need for the operator to search through a card stack for the record to be processed, thus decreasing the possibility of error and generally increasing the efficiency of processing of the records. Also it will be appreciated that the operator of the business machine may, by merely indexing an account number, have the corresponding card automatically selected from a card stack and delivered to the machine in position for processing following which the card will be transported to one of a number of designations depending upon whether or not the card is filled. Further, we have provided a card transport apparatus in which only the cards called for by the operator proceed to the machine, the others being automatically by-passed to avoid unnecessary time taking operations at the machine. In addition, we have provided a card transport apparatus including intercooperating control systems which control the transport of the cards in such manner as to restack the processed and by-passed inactive account cards in their original order.

What is claimed is:

1. In an accounting apparatus having a platen, a system for transporting account cards from a stack thereof to the platen comprising, a card guideway for association with the platen, a first feed means operable to feed cards singly from the card stack into said guideway, a manually operable control member operatively connected to said feed means to initiate feeding of the cards, a second card feed means at said guideway operable to feed a card therealong, and a card actuated control member actuated by a card entering said guideway and operatively connected to stop said first card feed means and start said second card feed means.

2. In an accounting apparatus, a support, a rotatable platen on said support operable to line index an account card associated therewith to the next printing space on the card, a card guideway to receive a card and disposed adjacent said platen, card ejecting means positioned along said guideway and operable to eject the card therefrom, a card actuated switch member positioned along said guideway and operatively connected to control said card ejecting means, a card receptacle in communication with said guideway to receive unfilled cards ejected from said guideway, a filled card receptacle, a branch guideway leading from said first guideway to said filled card receptacle by-passing said first receptacle, an electrically operated card deflector member controlling said branch guideway, and a card actuated switch member positioned along said first guideway and operable in response to line indexing of the card to the last line position thereof to control said deflector member.

3. In a system for transporting and controlling the disposition of record cards with respect to an information recording means, a first guideway for association with the information recording means, a card supply guideway in communication with said first guideway and along which cards having each an account identifying symbol thereon are fed singly from a source of supply, a card disposal guideway in communication with said first guideway, a branch card disposal guideway communicating with said supply guideway and leading to the receptacle to by-pass said first guideway, an electrically operable card deflector member at the juncture of said supply and branch guideways operable in one position to communicatively connect said branch guideway to said supply guideway and movable to another position to communicatively connect said first guideway to said supply guideway, a plurality of settable switch members electrically representative respectively of the account identifying symbols, and a switch member operable to respond to the symbols on cards enroute along said supply guideway anterior to the juncture of the supply and branch guideways, said settable switch members and said responsive switch member electrically connected together and operatively connected to and controlling operation of said deflector member.

4. In a system for transporting and controlling the disposition of record cards with respect to an information recording means, a first guideway for association with the information recording means and having a common entrance-exit, a supply guideway leading from a card source to said entrance-exit for passage of record cards having each an account identifying symbol thereon, means to feed cards singly along said supply guideway, a card receptacle, a card disposal guideway leading from said entrance-exit to said receptacle, a branch guideway communicating with said supply guideway and leading to said receptacle to by-pass said first guideway, an electrically operated card deflector member at the juncture of said supply and branch guideways, said deflector member normally in a position to direct a card into said branch guideway and movable to another position to direct another of the cards into said first guideway, a plurality of individually settable switch members electrically representative of the symbols on the cards, and a switch member responsive to the symbols on cards enroute along said supply guideway anterior to the juncture of said supply and branch guideways, said settable switch members and said responsive switch member respectively electrically connected together and operatively connected to control said deflector member to direct the card to said first guideway.

5. In a system for transporting and controlling the disposition of record cards with respect to an information recording means, a first guideway for association with the information recording means and having a common entrance-exit, a supply guideway leading from a card source to said entrance-exit for passage of record cards having each an identifying symbol thereon, means to feed cards singly along said supply guideway, a card receptacle, a card disposal guideway leading from said entrance-exit to said receptacle, a branch guideway communicating with said supply guideway and leading to said receptacle to by-pass said first guideway, an electrically operated card deflector member at the juncture of said supply and branch guideways, said deflector member normally in a position to direct a card into said branch guideway and movable to another position to direct another of the cards into said first guideway, a plurality of settable switch members electrically representative respectively of the symbols on the cards, and a switch member responsive to said symbols on the cards enroute along said supply guideway anterior to the juncture of said supply and branch guideways, said settable switch members and said responsive switch member electrically connected together and operatively connected to control said deflector member to direct a card to said first guideway, an electrically operable stop member positioned to stop a card enroute along said branch guideway, said stop member having a card stopping position and a retracted position, and a switch member at said receptacle actuated by a card from said disposal guideway and electrically connected to effect retraction of said stop member.

6. In a system for transporting and controlling the disposition of record cards with respect to an information recording means, a first guideway for association with the information recording means, a card supply guideway in communication with said first guideway and along which cards are fed singly from a source of supply with each of the cards having an account identifying symbol thereon, a disposal guideway in communication with said first guideway and having a discharge end for discharging cards in stacked relation in a receptacle, a branch guideway communicating with said supply guideway and leading to the receptacle to by-pass said first guideway, an electrically operable card deflector member at the juncture of said supply and branch guideways operable in one position to direct cards into said branch guideway and movable to another position to direct cards into said first guideway, a plurality of settable switch members respectively electrically representative of the account identifying symbols, and a switch member responsive to the symbols on the cards enroute along said supply guideway anterior to the juncture of the supply and branch guideways, said settable switch members and said responsive switch member electrically connected together and operatively connected to and controlling operation of said deflector member, a plurality of electrically operated card stop members spaced along said card supply guideway and movable to positions to stop the travel of the cards along said supply guideway, and a card operated switch in the path of card travel between said first guideway and said supply guideway and controlling said electrically operated stop members.

7. In a system for transporting and controlling the disposition of record cards with respect to an information recording means, a first guideway for association with the information recording means, a card supply guideway along which cards having each an identifying symbol thereon are fed singly, said supply guideway having an exit in communication with said first guideway, a card receptacle, a card disposal guideway having an entrance adjacent said exit for receiving a card from said first guideway and in communication with said receptacle, card feed means associated with said exit and with said entrance to feed a card into said first guideway and subsequently out of said first guideway into the disposal guideway, a branch guideway communicating with said supply guideway anterior to the exit with respect to the direction of travel of the cards and in communication with said receptacle, an electrically operated card deflector member at the juncture of said supply and branch guideways, said deflector member movable to one position to direct a card to said first guideway and to another position to direct another card into said branch guideway, a plurality of settable switch members electrically representative respectively of the account identification symbols, a switch member responsive to the symbols on the cards enroute along said supply guideway anterior to the juncture of said supply and branch guideways, said plurality of switch members and said responsive switch member electrically connected together and operatively connected to and for mutually controlling said electrically operated deflector member, a card ejecting means operable to eject a card from said first guideway into said disposal guideway, a switch member actuated by a card moving along said first guideway and operatively connected to and controlling said card ejecting means, electrically operated stop means holding the next successively fed card against being fed into said first guideway by said feed means and operable to release the card, and a card actuated switch at said entrance operatively connected to and controlling both said stop means and said card ejecting means.

8. In an accounting apparatus having a platen, a system for transporting and controlling the feeding of record cards singly from a stack of the cards to the platen comprising a card guideway for directing the cards to the platen, a first feed means operable to feed cards singly from the card stack into said guideway, a manually operable control member operatively connected to said feed means and operable to initiate the feeding of cards from the stack, a second card feed means at said guideway operable to feed a card therealong, and a second control member actuated by a card entering said guideway and operatively connected to stop said first card feed means and start said second card feed means.

9. In an accounting apparatus having an amount recording means, a system for transporting and controlling movement of record cards to the recording means comprising a first card guideway for association with the recording means, a card supply guideway having an inlet and communicating with said first card guideway, a first electrically operated feed means at the inlet of said supply guideway operable to feed cards singly into said supply guideway in predetermined spaced apart relation, second feed means associated with said supply guideway to feed the cards therealong in succession to said first guideway, a plurality of electrically operable stop members spaced along said supply guideway respectively to intercept and stop the cards, said stop members retractable to release the cards, a first switch member operatively connected to said electrically operable stop members and to said first feed means and operable to effect starting of said first feed means and also to effect retraction of said stop members, a third card feed means, said third card feed means at said first guideway and operable to feed a card therealong, and a second switch member actuated by a card entering said first guideway and operatively connected to stop said first feed means and start said third feed means and release said stop members.

10. In a system for transporting and controlling the disposition of record cards with respect to an information recording means, a first card guideway for guiding cards relative to the recording means, a first feed means operable to feed cards singly from a stack of record cards each having an account identifying number thereon and stacked numerically, a card supply guideway communicatively connecting said first feed means and said first guideway, a card disposal guideway leading from said first guideway and having a discharge end, a card receptacle at the discharge end of said disposal guideway and into which the cards are fed in stacked relation, feed means associated with said first guideway and operable to feed a card into said disposal guideway, a branch guideway communicatively connected to said supply guideway and leading to said receptacle to by-pass said first guideway, an electrically operated movable deflector member at the juncture of said supply and branch guideways, said deflector member movable to a position to direct record cards into said branch guideway and to another position to direct a record card to said first guideway, a settable switch member electrically representative of one of the card symbols, a second switch member responsive to the said one symbol passing enroute along said supply guideway anterior to said deflector member, said switch members electrically connected to and mutually controlling said deflector member, a normally open electrically operated gate positioned along said branch guideway, a card actuated switch member at said first guideway operatively connected to control operation of said gate to stop a card enroute along said branch guideway, and a card actuated switch member at the discharge end of said discharge guideway operatively connected to effect the opening of said gate.

11. In a system for transporting and controlling disposition of record cards, a rotatable platen of an accounting machine and rotatable to move a record card to the next printing space on the card with reference to a print line, a first card guideway associated with said platen to guide a card relative thereto, electrically operated means at said first guideway operable to eject a card therefrom, a manually operable switch operatively connected to said electrically operated means, a first card receptacle in communication with said first guideway, a second card receptacle, a branch guideway in communication with said first guideway and leading to said second receptacle, an electrically operated card deflector member at the juncture of said first and branch guideways, said deflector member in one position directing a card to said first receptacle and in another position directing a card to said second receptacle, and a card actuated switch member at said first guideway electrically connected to said manually operable switch and to said electrically operated deflector member to control operation of the latter, said card actuated switch member actuated by and upon movement of a card by said platen to a predetermined position relative to said print line.

12. In a system for transporting and controlling disposition of record cards with respect to business machines having print means, a platen rotatable to move a record card to the next printing space thereon with reference to a print line, a first card guideway adjacent said platen to guide a card relative thereto, means associated with said first guideway and operable to eject a card therefrom, a card receptacle in communication with said first guideway, a second card receptacle, a branch guideway leading from said first guideway to said second receptacle by-passing said first receptacle, an electrically operated card deflector member at said branch guideway, said deflector member movable from a normal position deflecting cards to said first receptacle to a second position to deflect a card into said branch guideway, a switch member positioned along said first guideway and held open by a card in said first guideway in all card positions other than the last line position, said switch member operatively connected to said electrically operated deflector member and operable when released to effect movement of said deflector member to said second position, a second switch member electrically connected to said first switch member, said switch members mutually controlling said deflector member, and a timed operator operable to close and then open said second switch member prior to ejection of a card by said ejecting means.

13. In a system for transporting and controlling the disposition of successively fed record cards, a continuously operating main conveyor having a feed end to receive the cards and a discharge end, said conveyor interrupted intermediate its ends providing an exit and an entrance, a continuously operating branch conveyor in communication with said main conveyor between said feed end and said exit to by-pass said exit, an electrically operated card deflector member at the juncture of said main and branch conveyors, said deflector member normally deflecting cards to said branch conveyor and movable to a position to direct cards to said exit, account identifying symbols respectively carried by the cards, a settable switch member representative of one of said symbols, a switch member responsive to the passing of said one symbol along said main conveyor between said feed end and said deflector member, said switch members electrically connected and operatively connected to said electrically operated deflector member to effect movement thereof to said position.

14. In a system for transporting and controlling the disposition of account cards with respect to an amount recording means, a first card guideway for association with the recording means, a supply guideway to guide account cards having each an account identifying symbol thereon, said supply guideway in communication with said first guideway, a first feed means operable to feed cards singly along said supply guideway, card ejecting means operable to eject a card from said first guideway, a card receptacle in communication with said first guideway to receive the ejected card, a branch guideway in communication with said supply guideway and said receptacle and bypassing said first guideway, an electrically operated card deflector member at the juncture of said supply and branch guideways and operable in one position to deflect cards into said branch guideway and in another position to deflect other cards to said first guideway, a plurality of individually settable switch members representative respectively of the account symbols, a switch member responsive to the symbols on cards passing a point along said supply guideway anterior to said deflector member and operatively connected to said settable switches to control operation of said electrically operated deflector member, a resettable counter operated switch member actuated by cards passing along said branch guideway and operatively connected to stop said first card feed means upon the bypassing of a predetermined number of cards, and a card actuated switch member actuated by a card entering said first guideway and operatively connected to stop said first card feed means and reset said counter actuated switch member.

References Cited in the file of this patent

UNITED STATES PATENTS

| | | |
|---|---|---|
| 2,254,931 | Bryce | Sept. 2, 1941 |
| 2,357,455 | Bryce | Sept. 5, 1944 |
| 2,539,998 | Holland-Martin et al. | Jan. 30, 1951 |
| 2,900,146 | Hafner et al. | Aug. 18, 1959 |
| 2,912,925 | Rabinow | Nov. 17, 1959 |

FOREIGN PATENTS

| | | |
|---|---|---|
| 1,059,906 | France | Nov. 18, 1953 |